(12) United States Patent
Tylik et al.

(10) Patent No.: US 11,372,665 B2
(45) Date of Patent: Jun. 28, 2022

(54) SYSTEM AND METHOD FOR NATIVE AND NON-NATIVE REPLICATION FOR VIRTUAL VOLUME BASED MACHINES

(71) Applicant: EMC IP Holding Company, LLC, Hopkinton, MA (US)

(72) Inventors: Dmitry Tylik, Westborough, MA (US); Girish Sheelvant, Hopkinton, MA (US); Michael Zeldich, Newton, MA (US); Nagasimha G. Haravu, Apex, NC (US); William C. Whitney, Marlborough, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 395 days.

(21) Appl. No.: 16/530,779

(22) Filed: Aug. 2, 2019

(65) Prior Publication Data

US 2021/0034402 A1 Feb. 4, 2021

(51) Int. Cl.
| | |
|---|---|
| G06F 9/455 | (2018.01) |
| G06F 16/27 | (2019.01) |
| G06F 3/06 | (2006.01) |
| G06F 9/448 | (2018.01) |
| G06F 21/62 | (2013.01) |

(52) U.S. Cl.
CPC .......... *G06F 9/45558* (2013.01); *G06F 3/065* (2013.01); *G06F 9/4493* (2018.02); *G06F 16/27* (2019.01); *G06F 21/6218* (2013.01); *G06F 16/273* (2019.01); *G06F 16/275* (2019.01); *G06F 2009/45562* (2013.01); *G06F 2009/45587* (2013.01)

(58) Field of Classification Search
None
See application file for complete search history.

(56) References Cited

U.S. PATENT DOCUMENTS

2017/0371567 A1* 12/2017 Piduri .................. G06F 3/0665
2020/0133502 A1*  4/2020 Yang .................... G06F 3/0613

* cited by examiner

*Primary Examiner* — Qing Yuan Wu
(74) *Attorney, Agent, or Firm* — Brian J. Colandreo; Mark H. Whittenberger; Holland & Knight LLP (57) ABSTRACT

A method, computer program product, and computer system for creating, with a first replication product, one or more groups of a plurality of groups that is empty in a storage array. A protection policy may be applied to the one or more groups on the first replication product, wherein the protection policy may include a replication rule. A policy profile may be created by the second replication product, wherein the replication rule may be included to the policy profile. The protection policy may be applied to a virtual machine (VM). The policy profile may be applied to the VM. The first replication product may replicate one or more virtual volumes of the VM on a remote system based upon, at least in part, the replication rule.

20 Claims, 6 Drawing Sheets

SYSTEM AND METHOD FOR NATIVE AND NON-NATIVE REPLICATION FOR VIRTUAL VOLUME BASED MACHINES

BACKGROUND

Some storage systems may require tighter and tighter integration (e.g., with hypervisors/virtualization environments). To facilitate such integration, vendors may introduce specialized Application Programming Interfaces (APIs), such as VASA 3.0 for example. Such an API may be based on the notion of Virtual Volumes (VVols) that may represent individual virtual storage devices (e.g., disks) of virtual machines (VMs). The major difference between such an API and previous or similar APIs may be the support for VVol/virtual machine granular replication.

BRIEF SUMMARY OF DISCLOSURE

In one example implementation, a method, performed by one or more computing devices, may include but is not limited to creating, with a first replication product, one or more groups of a plurality of groups that is empty in a storage array. A protection policy may be applied to the one or more groups on the first replication product, wherein the protection policy may include a replication rule. A policy profile may be created by the second replication product, wherein the replication rule may be included to the policy profile. The protection policy may be applied to a virtual machine (VM). The policy profile may be applied to the VM. The first replication product may replicate one or more virtual volumes of the VM on a remote system based upon, at least in part, the replication rule.

One or more of the following example features may be included. The one or more groups may be marked as compatible with the second replication product. The replication rule may include at least one of a replication destination and an interval between shipping replicas. Applying the policy profile to the VM may include identifying the one or more groups matching the replication rule in the policy profile. The first replication product configuration of VM replication and the second replication product configuration VM replication may result in the one or more groups of virtual storage devices to be replicated. Replication destination may be consistent across all of the virtual storage devices in the one or more groups. Replication frequency may be consistent across all of the virtual storage devices in the one or more groups.

In another example implementation, a computing system may include one or more processors and one or more memories configured to perform operations that may include but are not limited to creating, with a first replication product, one or more groups of a plurality of groups that is empty in a storage array. A protection policy may be applied to the one or more groups on the first replication product, wherein the protection policy may include a replication rule. A policy profile may be created by the second replication product, wherein the replication rule may be included to the policy profile. The protection policy may be applied to a virtual machine (VM). The policy profile may be applied to the VM. The first replication product may replicate one or more virtual volumes of the VM on a remote system based upon, at least in part, the replication rule.

One or more of the following example features may be included. The one or more groups may be marked as compatible with the second replication product. The replication rule may include at least one of a replication destination and an interval between shipping replicas. Applying the policy profile to the VM may include identifying the one or more groups matching the replication rule in the policy profile. The first replication product configuration of VM replication and the second replication product configuration VM replication may result in the one or more groups of virtual storage devices to be replicated. Replication destination may be consistent across all of the virtual storage devices in the one or more groups. Replication frequency may be consistent across all of the virtual storage devices in the one or more groups.

In another example implementation, a computer program product may reside on a computer readable storage medium having a plurality of instructions stored thereon which, when executed across one or more processors, may cause at least a portion of the one or more processors to perform operations that may include but are not limited to creating, with a first replication product, one or more groups of a plurality of groups that is empty in a storage array. A protection policy may be applied to the one or more groups on the first replication product, wherein the protection policy may include a replication rule. A policy profile may be created by the second replication product, wherein the replication rule may be included to the policy profile. The protection policy may be applied to a virtual machine (VM). The policy profile may be applied to the VM. The first replication product may replicate one or more virtual volumes of the VM on a remote system based upon, at least in part, the replication rule.

One or more of the following example features may be included. The one or more groups may be marked as compatible with the second replication product. The replication rule may include at least one of a replication destination and an interval between shipping replicas. Applying the policy profile to the VM may include identifying the one or more groups matching the replication rule in the policy profile. The first replication product configuration of VM replication and the second replication product configuration VM replication may result in the one or more groups of virtual storage devices to be replicated. Replication destination may be consistent across all of the virtual storage devices in the one or more groups. Replication frequency may be consistent across all of the virtual storage devices in the one or more groups.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to, the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
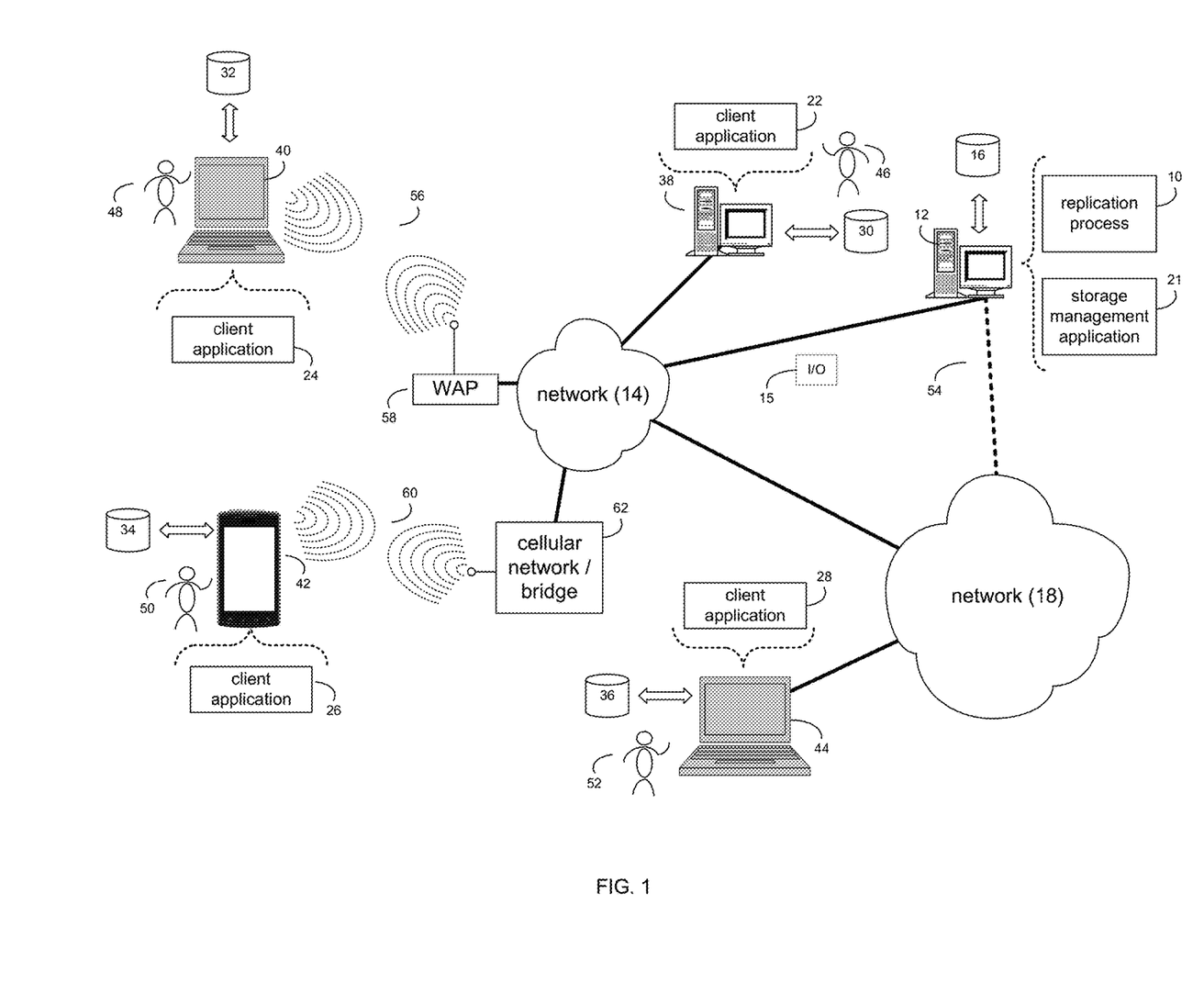
FIG. 1 is an example diagrammatic view of a replication process coupled to an example distributed computing network according to one or more example implementations of the disclosure.

Referring now to the example implementation of FIG. 1, there is shown replication process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows® Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a replication process, such as replication process 10 of FIG. 1, may create, with a first replication product, one or more groups of a plurality of groups that is empty in a storage array. A protection policy may be applied to the one or more groups on the first replication product, wherein the protection policy may include a replication rule. A policy profile may be created by the second replication product, wherein the replication rule may be included to the policy profile. The protection policy may be applied to a virtual machine (VM). The policy profile may be applied to the VM. The first replication product may replicate one or more virtual volumes of the VM on a remote system based upon, at least in part, the replication rule.

In some implementations, the instruction sets and subroutines of replication process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, replication process 10 may be a component of the data store, a stand-alone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, replication process 10 and/or storage management application 21 may be accessed via one or more of client applications 22, 24, 26, 28. In some implementations, replication process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within replication process 10, a component of replication process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of replication process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of replication process 10 (and vice versa). Accordingly, in some implementations, replication process 10 may be a purely server-side application, a purely client-side application, or a hybrid server-side/client-side application that is cooperatively executed by one or more of client applications 22, 24, 26, 28 and/or replication process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, replication process 10, and storage management application 21, taken singly or in any combination, may effectuate some or all of the same functionality, any description of effectuating such functionality via one or more of client applications 22, 24, 26, 28, replication process 10, storage management application 21, or combination thereof, and any described interaction(s) between one or more of client applications 22, 24, 26, 28, replication process 10, storage management application 21, or combination thereof to effectuate such functionality, should be taken as an example only and not to limit the scope of the disclosure.

In some implementations, one or more of users 46, 48, 50, 52 may access computer 12 and replication process 10 (e.g., using one or more of client electronic devices 38, 40, 42, 44) directly through network 14 or through secondary network 18. Further, computer 12 may be connected to network 14 through secondary network 18, as illustrated with phantom link line 54. Replication process 10 may include one or more user interfaces, such as browsers and textual or graphical user interfaces, through which users 46, 48, 50, 52 may access replication process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
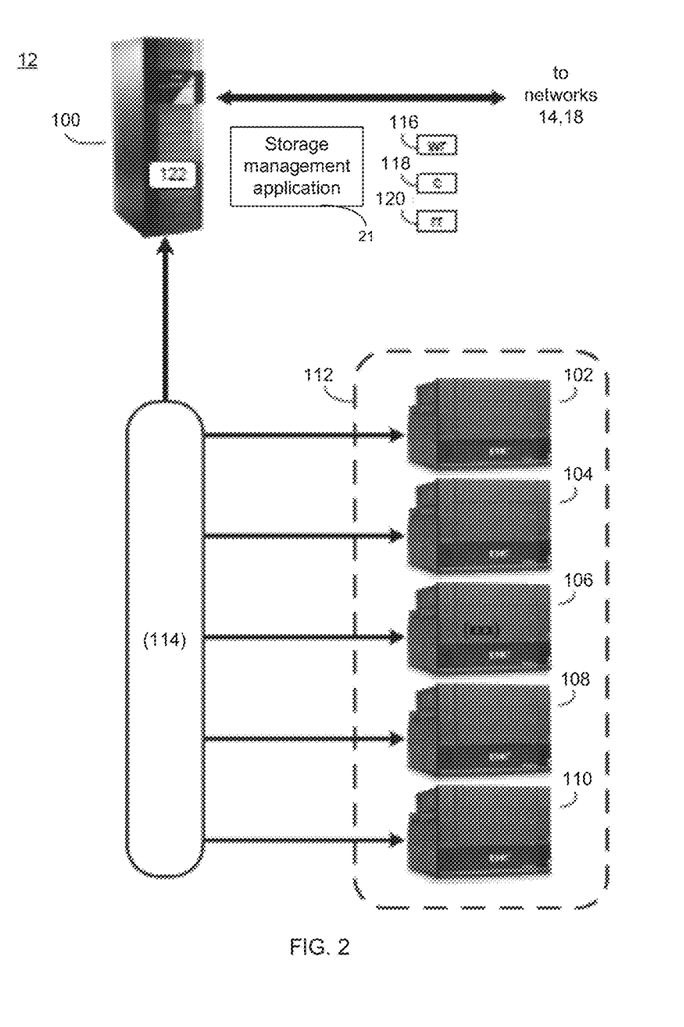
FIG. 2 is an example diagrammatic view of a storage system of FIG. 1 according to one or more example implementations of the disclosure.
Figure 3:
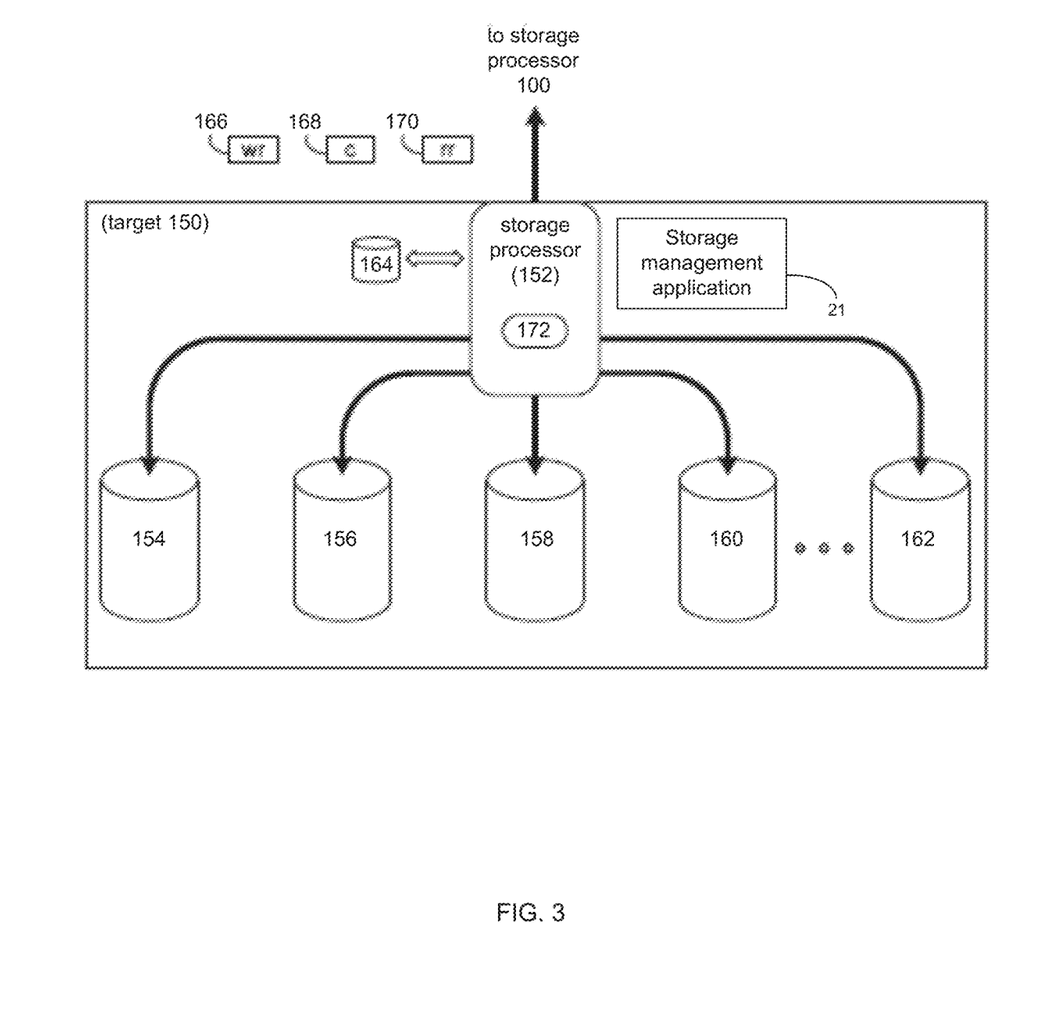
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or replication process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

As noted above, some storage systems may require tighter and tighter integration (e.g., with hypervisors/virtualization environments). To facilitate such integration, vendors may introduce specialized Application Programming Interfaces (APIs), such as VASA 3.0 for example. Such an API may be based on the notion of Virtual Volumes (VVols) that may represent individual virtual storage devices (e.g., disks) of virtual machines (VMs). The major difference between such an API and previous or similar APIs may be the support for VVol/virtual machine granular replication.

Some data center level protection products may only leverage such a replication API in particular replication products, such as APIs the example and non-limiting VMware Site Recovery Manager (SRM), which may not be included in products like the example and non-limiting VMware vSphere, which may be a primary building block for virtualized environments. As such, it may be cost effective and easier on the end user of either replication product to enable the ability to protect their VVol-based virtual machines with either APIs who may not require complexity and power. In both cases, as much common implementation as possible may be leveraged.

Therefore, as will be discussed below, the present disclosure may leverage a common replication engine for both native and non-native orchestration of VVol-based virtual machines replication as well as failover in the virtual machines protection space. While some systems may implement APIs for VVol-based VMs replication, those APIs may only integrate with specific replication products, and thus are not unified or allow native failover orchestration for replicated VVol-based virtual machines.

Figure 4:
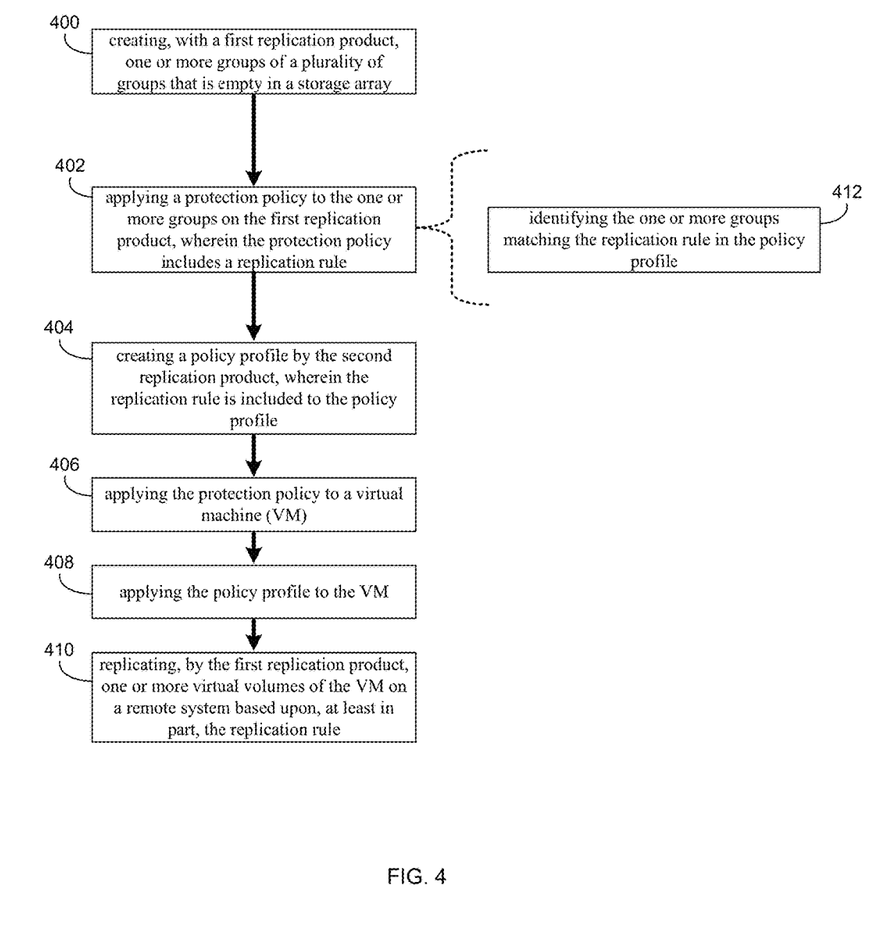
FIG. 4 is an example flowchart of a replication process according to one or more example implementations of the disclosure.
Figure 5:
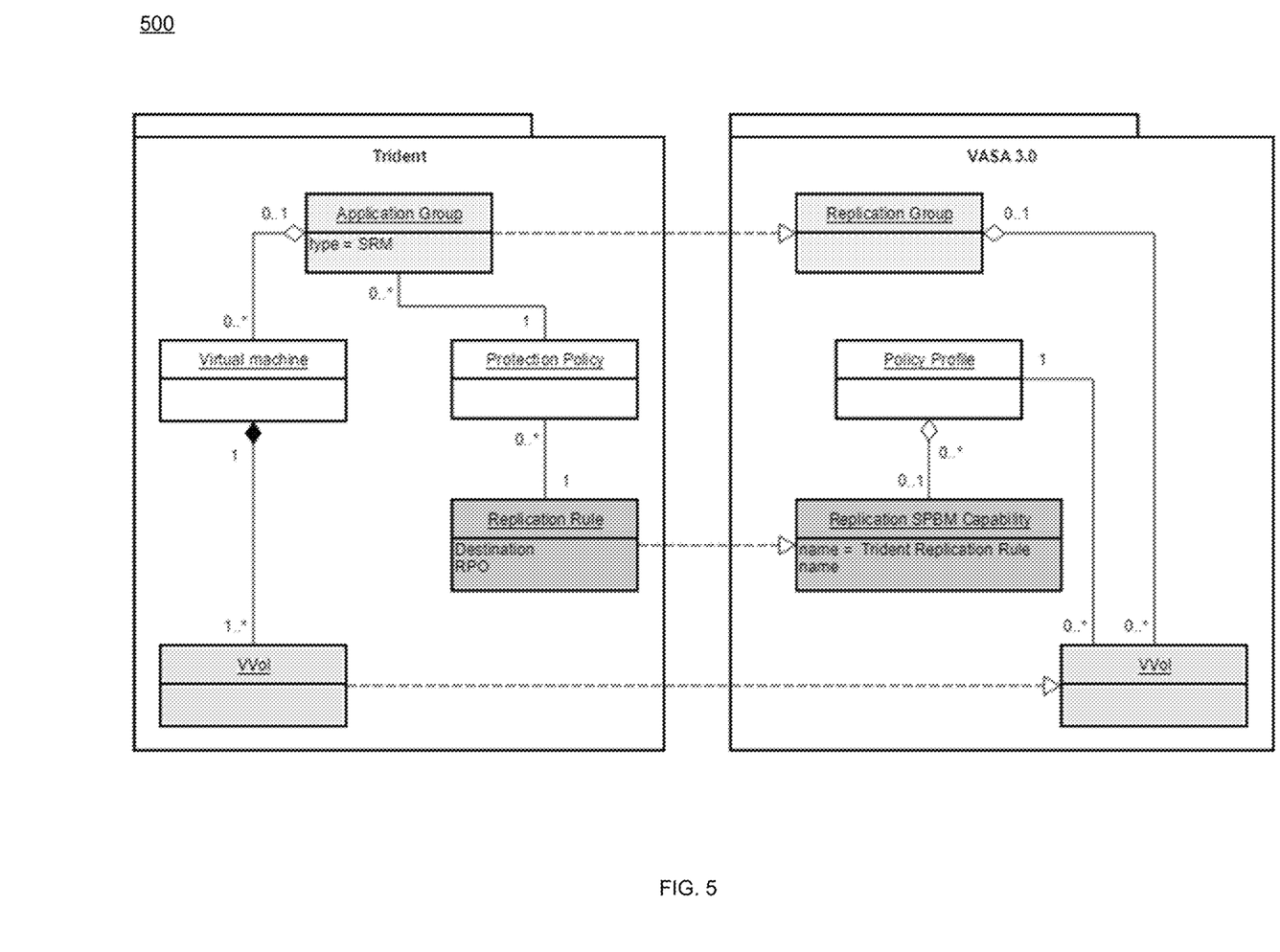
FIG. 5 is an example diagrammatic view of a system capable of replication of VVol-based virtual machines.
Figure 6:
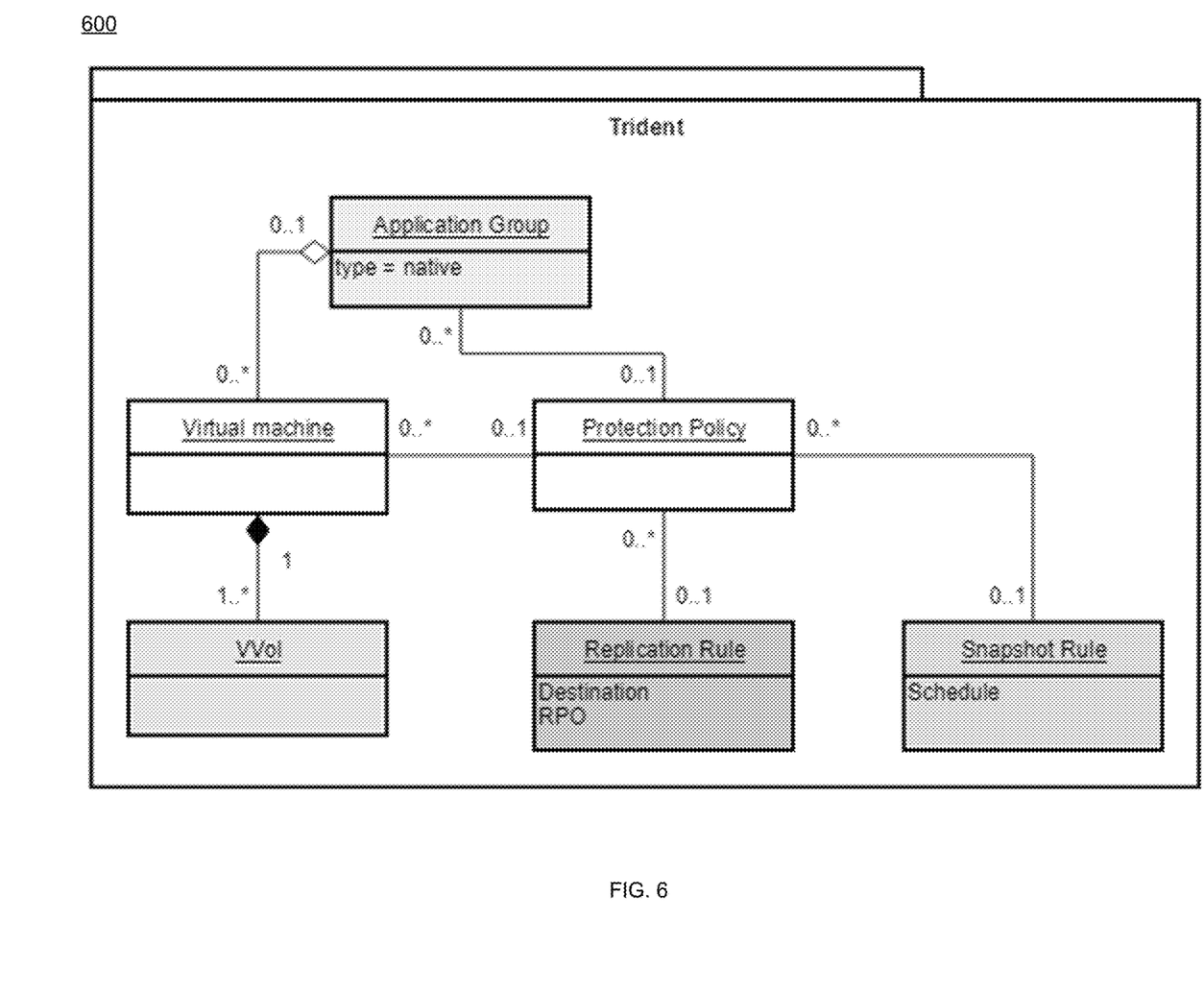
FIG. 6 is an example diagrammatic view of a system capable of native and non-native replication of VVol-based virtual machines to one or more example implementations of the disclosure.

The Replication Process:

As discussed above and referring also at least to the example implementations of FIGS. 4-6, replication process 10 may create 400, with a first replication product, one or more groups of a plurality of groups that is empty in a storage array. Replication process 10 may apply 402 a protection policy to the one or more groups on the first replication product, wherein the protection policy may include a replication rule. Replication process 10 may create 404 a policy profile by the second replication product, wherein the replication rule may be included to the policy profile. Replication process 10 may apply 406 the protection policy to a virtual machine (VM). Replication process 10 may apply 408 the policy profile to the VM. Replication process 10 may (via the first replication product) replicate 410 one or more virtual volumes of the VM on a remote system based upon, at least in part, the replication rule.

Referring at least to the example FIG. 5, an example implementation of a system 500 capable of replication of VVol-based virtual machines is shown. Even though the VASA 3.0 API (or similar API) may require VASA vendor providers to expose replication groups to, e.g., vSphere (or similar replication products), this does not mean this concept must also be implemented in the present disclosure. Instead, replication process 10 may map a first replication product side object to replication groups to support a second replication product. As will be discussed below, replication process 10 may enable the extension of the application group concept to include VVol-based virtual machines in addition to volumes and also make it a unit of protection. Application groups defined like this may be used for both native and non-native replication, which may have some differences between two cases, shown in Table 1 below:

TABLE 1

| | "Regular" Application Groups | Second Replication product Application Groups |
|---|---|---|
| Visibility in vSphere | Not necessarily visible to vSphere over VASA API. If required, may be displayed in VSI plug-in using REST API to retrieve from First replication product | Exposed to vSphere and second replication product as Replication Groups |
| Supported storage objects | Both volumes and virtual machines are supported (though not a mix of both types within the same Application Group) | May support only virtual machines |
| Protection policy requirements | May not be useful without a protection policy assigned (for monitoring) and with protection policy that has either snapshot or replication rules or both (where snapshots may be vSphere side managed snapshots or First replication product-native snapshots and replication once implemented). | May not be useful without a protection policy with replication rule. Creation of an second replication product-type Application Group without a protection policy that includes a replication rule should generally not be allowed. May have snapshot rule in addition to replication rule that can either trigger managed snapshots or First replication product-native snapshots. |
| Workflow control | Volumes and virtual machines may be added to the Application Group from First replication product side. First replication product-native virtual machine management may be exposed to vSphere leveraging VSI plug-in (which still invokes First replication product using REST API) | Virtual machines may be added to the Application Group from vSphere (where it shows up as a Replication Group) leveraging vSphere Storage Policy Based Management (SPBM) consuming First replication product replication rules exposed as SPBM capabilities within Replication Line-of-Service. |
| Protection policy control | Protection policy is assigned from the First replication product side. | Protection policy may be assigned from the First replication product side. The assigned protection policy has to have a replication rule. If the protection policy is updated and is then different from individual virtual machine policies assigned from vSphere side, it may be reported as a policy compliance alarm to vSphere. |

In addition to replicating application groups of virtual machines, for the native replication product, it may be possible to replicate individual VVol-based VMs by assigning protection policies directly to a virtual machine. In this case, both application group and individual virtual machine may become grouping constructs that may be handled by the native (e.g., first) replication product replication session, policy engine and other components. The similarities and differences between the steps to implement both native and non-native replication of individual VVol-based VMs is shown for example purposes only in Table 2 below, in conjunction with the example implementation of FIG. 6 showing a system 600 capable of native and non-native replication of VVol-based virtual machines:

TABLE 2

| First replication product-native Replication Workflow | Second replication product based Replication Workflow |
|---|---|
| Step 1 (First replication product): create remote system object to represent the replication peer | |
| Step 2 (First replication product): create remote replication rule. Add it to protection policy | |
| | Step 3 (First replication product): create an application group and mark it as second replication product compatible |
| | Step 4 (First replication product): apply the protection policy to the application group |
| | Step 5 (Second replication product): create a policy profile and add First replication product replication rule exposed as Replication Line-of-Service SBPM capability |

TABLE 2-continued

| First replication product-native Replication Workflow | Second replication product based Replication Workflow |
|---|---|
| Step 3 (Second replication product): create a virtual machine | |
| Step 6 (First replication product): apply the protection policy to just created virtual machine | Step 6 (Second replication product): apply the policy profile to an existing or a new virtual machine. Select the replication group from the list |
| Step 7 (First replication product): replication session starts syncing VVols to the remote system. Virtual machine may show up in the TMA/REST API, but not necessarily in vSphere inventory yet. Individual VVols may not be visible either. | |
| Step 8 (First replication product): once the initial sync finishes, the virtual machine is available for test/planned/unplanned failover. (not visible in vSphere yet) | Step 8 (Second replication product): once the initial sync finishes the virtual machine is available for test/planned/unplanned failover. |
| Step 9 (remote First replication product): test failover makes the virtual machine available in remote second replication product inventory (in addition to the local second replication product inventory) | Step 9 (Second replication product): test failover makes the virtual machine available in remote second replication product inventory (in addition to the local second replication product inventory) |
| Step 10 (remote First replication product): planned failover makes the virtual machine available in remote second replication product inventory and removes from the local second replication product inventory. The virtual machine may still show up in the local First replication product GUI/REST. The replication relationship is reversed and the virtual machine is available at the local First replication product for test/planned/unplanned failover (roles are essentially switched at this point) | Step 10 (Second replication product): planned failover makes the virtual machine available in remote second replication product inventory and removes from the local second replication product inventory. The virtual machine storage still shows up in the local First replication product GUI/REST. The replication relationship is reversed. |

For example, in some implementations, replication process 10 may create 400, with a first replication product (which may for example purposes only be associated with the Trident storage system provided by Dell/EMC), one or more groups of a plurality of groups that is empty in a storage array, and in some implementations, the one or more groups may be marked as compatible with the second replication product. For example, a storage administrator may (e.g., via replication process 10) create an empty group on the storage array side and mark it as compatible with the second replication product (e.g., SRM). The second replication product compatibility may make the group reported as VVol Replication Group via VASA API. It will be appreciated that while Trident, vSphere, SRM, and VASA APIs are used in the present disclosure, this is for example purposes only and not intended to limit the scope of the present disclosure. As such, the use of these particular items should be taken as example only and not to otherwise limit the scope of the disclosure.

In some implementations, replication process 10 may apply 402 a protection policy to the one or more groups on the first replication product, wherein the protection policy may include a replication rule, and wherein the replication rule may include at least one of a replication destination and an interval between shipping replicas. For instance, the storage administrator may (e.g., via replication process 10) apply a protection policy to the group. The protection policy may include one or more replication rules that defines replication destination and RPO (interval between shipping replicas). Since the storage administrator should be in control of storage array resources utilization including utilization by on-going replication sessions, replication destination and RPO may be specified by the storage administrator (e.g., via replication process 10) on the native (e.g., first) replication product and not the non-native (e.g., second) replication product administrator.

In some implementations, replication process 10 may create 404 a policy profile by the second replication product, wherein the replication rule may be included to the policy profile. For example, replication rules defined by the storage administrator (e.g., via replication process 10) on the storage array side may be exposed as capabilities that may be leveraged in the second replication product framework. The replication rule name may translate into replication capabilities names. Replication capabilities may then be included in storage policies constructed by the second replication product administrator (e.g., via replication process 10).

In some implementations, replication process 10 may apply 406 the protection policy to a virtual machine (VM), where applying the policy profile to the VM may include identifying 412 the one or more groups matching the replication rule in the policy profile. For instance, as virtual machines are created in the second replication product environment, the storage array may retrieve information on the virtual machines and make it available in the storage array management interface. The storage administrator may then (e.g., via replication process 10) apply protection policies to individual virtual machines or groups of virtual machines.

In some implementations, replication process 10 may apply 408 the policy profile to the VM. For example, the second replication product administrator may (e.g., via replication process 10) apply the constructed storage policy to a new and/or existing virtual machine. While the policy is being applied, the second replication product may send the storage policy to the storage array, which may return the list of groups that have matching replication rules in the assigned protection policy. This way, the storage administrator may (e.g., via replication process 10) define where the replication goes and how frequently, and the second replication product administrator may essentially "pick from the list."

In some implementations, replication process 10 may (via the first replication product) replicate 410 one or more virtual volumes of the VM on a remote system based upon, at least in part, the replication rule, where the first replication product configuration of VM replication and the second replication product configuration VM replication may result in the one or more groups of virtual storage devices to be replicated, and where the replication destination and frequency may be consistent across all of the virtual storage devices in the one or more groups. For example, at this point, both storage array native configuration of virtual machine replication and the non-native second replication product side configuration of virtual machine replication may result in a group of virtual storage devices to be replicated. Replication destination and frequency may thus be consistent across all disks in the group, and the replication engine may work uniformly regardless of configuration mechanism.

In some implementations, replication process 10 may multiple types of failover. For instance:

Test failover, e.g., creation of temporary copies of protected virtual machines at a disaster recovery site to validate consistency of remote copies, disaster recovery procedures and storage and computer resource allocation.

Planned failover, e.g., failover of protected virtual machines to the remote site in planned fashion and without data loss. This type of failover may be primarily used in migration and site swap scenarios.

Unplanned failover, e.g., failover of protected virtual machines when the data at the production site is either no longer available or corrupted (e.g., due to a disaster). This failover may involve potential data loss.

In some implementations, with the non-native second replication product orchestrating the failover, it may be sufficient for the storage array to implement related VASA 3.0 APIs (or similar API) and make remote copies of protected VVols available to the second replication product environment at the disaster recovery site. In case of native replication, the first native replication product may be responsible for failing over the virtual machines.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    creating, with a first replication product, one or more groups of a plurality of groups that is empty in a storage array, wherein the one of more groups of the plurality of groups includes at least one of
        one or more groups of virtual storage devices, and
        one or more application groups of virtual machines;
    applying a protection policy to the one or more groups on the first replication product, wherein the protection policy includes a replication rule;
    creating a policy profile by a second replication product, wherein the replication rule is included to the policy profile;
    applying the protection policy to a virtual machine (VM);
    applying the policy profile to the VM; and
    replicating, by the first replication product, one or more virtual volumes of the VM on a remote system based upon, at least in part, the replication rule.

2. The computer-implemented method of claim 1 wherein the one or more groups is marked as compatible with the second replication product.

3. The computer-implemented method of claim 1 wherein the replication rule includes at least one of a replication destination and an interval between shipping replicas.

4. The computer-implemented method of claim 1 wherein applying the policy profile to the VM includes identifying the one or more groups matching the replication rule in the policy profile.

5. The computer-implemented method of claim 1 wherein the first replication product configuration of VM replication and the second replication product configuration VM replication result in the one or more groups of virtual storage devices to be replicated.

6. The computer-implemented method of claim 1 wherein replication destination is consistent across all of the virtual storage devices in the one or more groups.

7. The computer-implemented method of claim 1 wherein replication frequency is consistent across all of the virtual storage devices in the one or more groups.

8. A non-transitory computer readable storage medium comprising a computer program product having a plurality of instructions stored thereon which, when, executed across one or more processors, causes at least a portion of the one or more processors to perform operations comprising:

creating, with a first replication product, one or more groups of a plurality of groups that is empty in a storage array, wherein the one of more groups of the plurality of groups includes at least one of
one or more groups of virtual storage devices, and
one or more application groups of virtual machines;
applying a protection policy to the one or more groups on the first replication product, wherein the protection policy includes a replication rule;
creating a policy profile by a second replication product, wherein the replication rule is included to the policy profile;
applying the protection policy to a virtual machine (VM);
applying the policy profile to the VM; and
replicating, by the first replication product, one or more virtual volumes of the VM on a remote system based upon, at least in part, the replication rule.

9. The computer program product of claim 8 wherein the one or more groups is marked as compatible with the second replication product.

10. The computer program product of claim 8 wherein the replication rule includes at least one of a replication destination and an interval between shipping replicas.

11. The computer program product of claim 8 wherein applying the policy profile to the VM includes identifying the one or more groups matching the replication rule in the policy profile.

12. The computer program product of claim 8 wherein the first replication product configuration of VM replication and the second replication product configuration VM replication result in the one or more groups of virtual storage devices to be replicated.

13. The computer program product of claim 8 wherein replication destination is consistent across all of the virtual storage devices in the one or more groups.

14. The computer program product of claim 8 wherein replication frequency is consistent across all of the virtual storage devices in the one or more groups.

15. A computing system including one or more processors and one or more memories configured to perform operations comprising:

creating, with a first replication product, one or more groups of a plurality of groups that is empty in a storage array, wherein the one of more groups of the plurality of groups includes at least one of
one or more groups of virtual storage devices, and
one or more application groups of virtual machines;
applying a protection policy to the one or more groups on the first replication product, wherein the protection policy includes a replication rule;
creating a policy profile by a second replication product, wherein the replication rule is included to the policy profile;
applying the protection policy to a virtual machine (VM);
applying the policy profile to the VM; and
replicating, by the first replication product, one or more virtual volumes of the VM on a remote system based upon, at least in part, the replication rule.

16. The computing system of claim 15 wherein the one or more groups is marked as compatible with the second replication product.

17. The computing system of claim 15 wherein the replication rule includes at least one of a replication destination and an interval between shipping replicas.

18. The computing system of claim 15 wherein applying the policy profile to the VM includes identifying the one or more groups matching the replication rule in the policy profile.

19. The computing system of claim 15 wherein the first replication product configuration of VM replication and the second replication product configuration VM replication result in the one or more groups of virtual storage devices to be replicated.

20. The computing system of claim 15 wherein replication destination and frequency are consistent across all of the virtual storage devices in the one or more groups.

* * * * *